Figure 1:
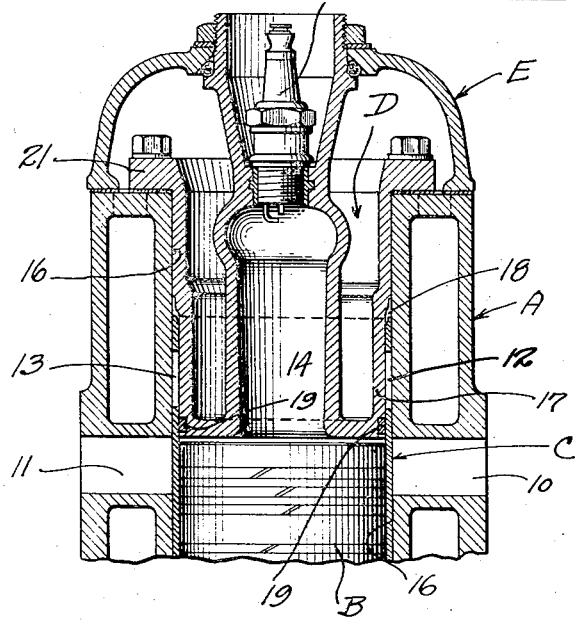

INVENTOR.
James O. Fink
BY
ATTORNEY.

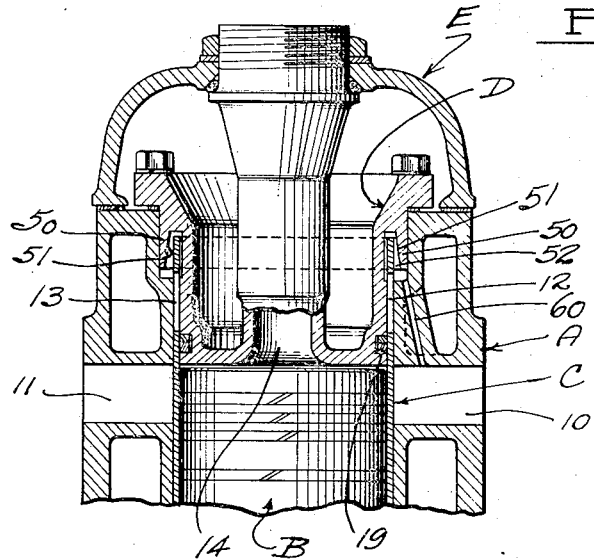
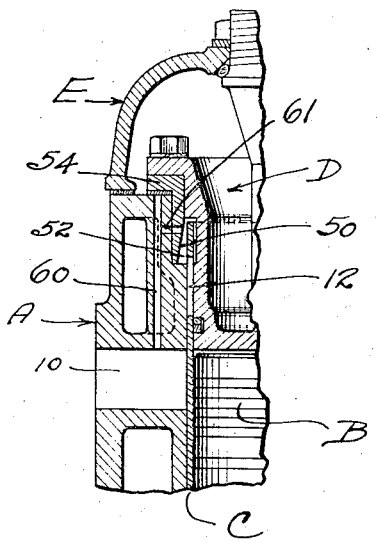
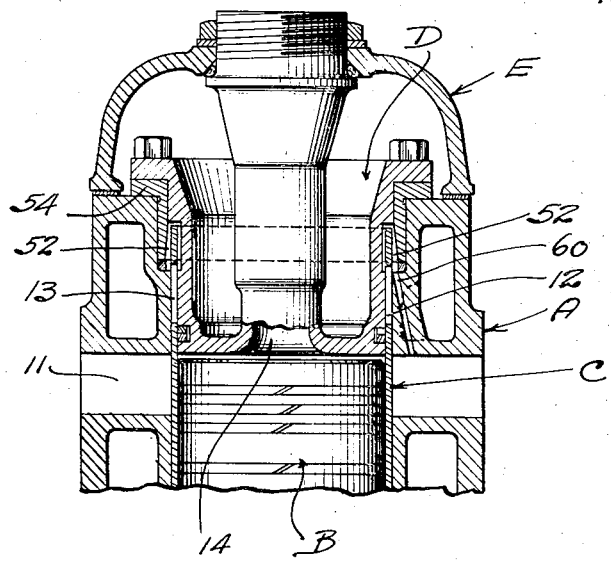

Patented July 25, 1933

1,919,544

UNITED STATES PATENT OFFICE

JAMES O. FINK, OF DETROIT, MICHIGAN, ASSIGNOR TO CONTINENTAL MOTORS CORPORATION, OF DETROIT, MICHIGAN, A CORPORATION OF VIRGINIA

INTERNAL COMBUSTION ENGINE

Application filed November 17, 1930. Serial No. 496,107.

My invention relates to internal combustion engines and more particularly to the cylinder and cylinder head construction of an engine of the sleeve valve type.

Much difficulty has been experienced in the past in accurately aligning the cylinder head structures with respect to the cylinder bores associated therewith, as that portion of each cylinder head structure which depends within the cylinder must be accurately spaced from the cylinder bore in order to not cause the sleeve valve means, which operates in said space, to bind.

It is an object of my present invention to facilitate the accurate assembly of the cylinder head structure with the cylinder structure of a sleeve valve internal combustion engine by providing piloting means to locate the head in a fixed predetermined position with respect to the cylinder bore.

It is a further object of my invention to provide improvements in cylinder head structures of sleeve valve types of engines.

A further object of my invention resides in the provision of a series of conduits or passages between the usual fuel mixture conducting system for the engine cylinder and the sleeve pocket, preferably self-contained within the engine structure whereby the sleeve valve means will exert a pumping action on the fuel mixture to circulate the same to keep the sleeve pocket washed and free of deposits. Thus the fuel mixture is circulated between the sleeve pocket and the fuel mixture conducting system carrying from the sleeve pocket any foreign particles, the latter passing to the engine combustion chamber where they are relatively harmless to the engine.

Figure 2:
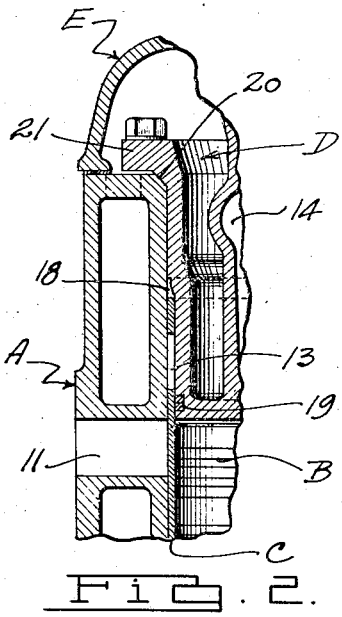
Figure 3:
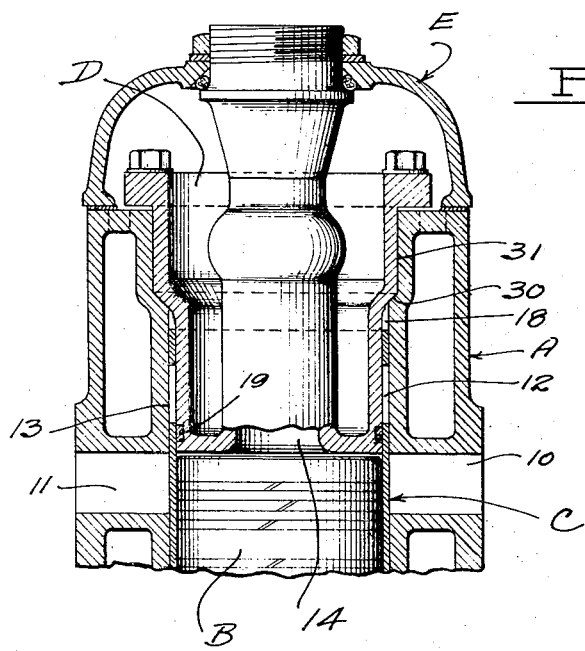
Figure 4:
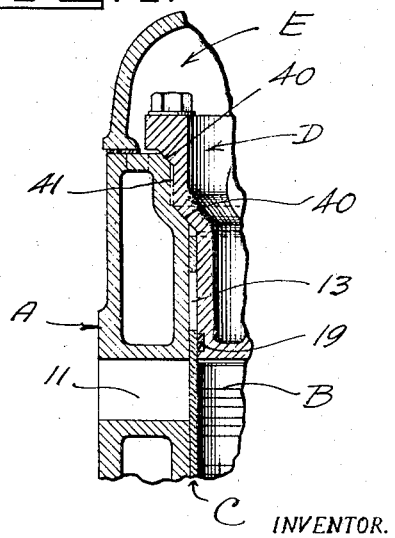

For a more detailed understanding of my invention, reference may be had to the accompanying drawings which illustrate preferred embodiments of my invention, like reference numerals indicating corresponding parts and in which:

Figure 1 is a fragmentary vertical transverse sectional view of a sleeve valve internal combustion engine illustrating one embodiment of my invention, Fig. 2 is a transverse fragmentary sectional view of a modified cylinder and cylinder head construction having a bevelled pilot, Fig. 3 is a transverse sectional view of a further modified type of cylinder head and cylinder construction having a bevelled pilot below a cylindrical pilot, Fig. 4 is a transverse sectional view of a further modified cylinder and cylinder head construction embodying the bevelled pilots of Figs. 2 and 3, Fig. 5 is a transverse sectional view of a further modified cylinder and cylinder head construction illustrating the cylinder head undercut or recess receiving the upper end of the sleeve valve means, Fig. 6 is a transverse sectional view of a further modified cylinder and cylinder head structure incorporating a sealing gasket for the cylinder head pilot, and Fig. 7 is a transverse sectional view of a further modified cylinder and cylinder head structure wherein the cylinder head pilot engages the cylinder land.

In general a sleeve valve internal combustion engine includes a cylinder structure A, a piston B operating in the cylinder, sleeve valve means C, a cylinder head structure D depending within the cylinder and spaced therefrom to provide a sleeve pocket for receiving the upper portion of the sleeve valve means, and a cylinder head cover E. Obviously any suitable type of sleeve valve means may be employed and I have chosen for the purpose of illustration, to show my invention incorporated in a single sleeve valve engine in which the sleeve is given a combined reciprocating and oscillating movement with respect to the cylinder and sleeve axes, wherein any point on the sleeve traces a closed path. The cylinders are ported for intake and exhaust as at 10 and 11 respectively while the sleeve valve intake and exhaust ports 12 and 13 respectively are arranged to respectively register with the cylinder intake and exhaust ports at predetermined times. The reentrant cylinder head D is preferably provided with a combustion chamber 14 and one or more spark plugs 15 adapted for igniting the fuel charge at the proper time.

As illustrated in Figure 1, the cylinder structure is provided with a substantially straight cylinder bore 16 the cylinder head having a portion 17 depending within the cylinder bore 16 and spaced therefrom to provide a sleeve pocket 18 for receiving the upper portion of the sleeve valve means. That portion of the depending cylinder head bounding the sleeve pocket is of less diameter than the cylinder bore and it preferably has a dimension permitting the sleeve valve means to freely slide in the pocket but is so constructed as to provide a minimum of clearance between the head and sleeve valve means to prevent the excessive leakage of oil by the sleeve. Preferably, one or more rings, 19 are carried by the head intermediate the head and sleeve valve to substantially seal against escape of any of the combustible fuel either before or after the same has been ignited.

The remaining portion of the depending cylinder head above the sleeve pocket has a diameter substantially the same as the cylinder bore, this portion of the head being termed a pilot means for locating the cylinder head in a predetermined fixed position with respect to the cylinder bore. The outer cylindrical faces of the depending cylinder head may be readily machined about the same axis to insure an accurate concentric relation between the plurality of outer faces of said cylinder head structure.

In Figure 2 the upper or outer edge of the cylinder bore is chamferred or beveled as at 20 and the cylinder head is provided with a similar bevel which is adapted to seat on the beveled seat carried by the cylinder structure. The purpose of this beveled seat is to seal the joint between the head and cylinder and to take the place of the usual gasket employed under the flange 20 carried by the head, a gasket of this character being shown in Figure 1.

In Figure 3 a beveled seat 30 is employed for the same purpose as that shown in Figure 2 with the difference that the beveled seat is located just above the sleeve pocket 18 and below the pilot means. In this construction, however, the upper portion of the cylinder bore is enlarged as at 31 and the pilot portion of the cylinder head is correspondingly enlarged.

In Figure 4 the cylindrical pilot means is eliminated and I provide a plurality of beveled seats 40 spaced axially of the cylinder, the cylinder bore intermediate the seats being enlarged as at 41 as well as that portion of the head intermediate the beveled portions and which is adapted for engagement with the seats 40. This plurality of spaced annular seats serves to pilot the head to locate or accurately align the same with respect to the cylinder bore, as well as to seal the joint therebetween.

In Figure 5 I have provided a depending pilot 50 having an outer cylindrical surface adapted for engagement with the enlarged bore 50$^a$ of the cylinder structure. The pilot portion 50 is undercut or recessed outwardly as at 51 to provide an annular pocket or recess 52 into which the outer end of the sleeve valve means C can be projected. I preferably construct this annular pocket or recess 52 of sufficient size to provide excess clearance between the sleeve valve means and the walls of recess. The lower extension of the head provides a cylindrical bearing surface 53 for the inside surface of the sleeve valve means. By the term "undercut" as applied to the pocket 51 I mean a recessed pocket and not necessarily a pocket formed by cutting as the clearance with the sleeve valve means permits the pocket 51 to be formed by casting.

In Figures 6 and 7 the pilot is constructed of a separate collar member 54 which may be sweated on or otherwise permanently secured to the cylinder head. If desired, however, cylinder head structures in Figs. 6 and 7 may have the collars 54 formed integrally with the main structure as shown in Fig. 5.

In these figures, 5 to 7 inclusive, I have shown the recessed sleeve pocket 52 connected with the cylinder intake port 10 by means of a passage 60 for utilizing the suction in the fuel mixture conducting means or part 10 for removing the sludge from the pocket. In Fig. 5 the pilot portion 50 is not seated on the cylinder land 50$^b$ but in Figs. 6 and 7 the corresponding pilot portions 54 are seated on the respective lands 50$^b$ by direct contact in Fig. 7 or by an intermediate sealing gasket 50$^c$ in Fig. 6. In Fig. 7 especially the cylinder head is additionally secured against tilting by reason of this seating of the cylinder head pilot 54 on the land 50$^b$. The cylinder structure thus has concentric inner and outer bores respectively accommodating the sleeve valve means C and the piloting portions of the cylinder head structure designated as 50 or 54. Figure 7 further illustrates the manner in which a lateral passage 61 may be provided which may pass through a portion of the cylinder wall and through the pilot 50 so as to place the upper portion of the annular pocket or recess 52 in communication with the passage 60 if so desired.

Referring particularly to Fig. 7 it will be noted that the cylinder block structure A is formed with the passage 60 and lateral passage 61 which communicates with the sleeve pocket 52 by reason of the passage 61$^a$ formed in pilot 50 of the cylinder head structure D. The member 54 of the cylinder head structure D is thus a flanged portion of structure D which is seated on the cylinder block structure A and which is also provided with the passage 61$^a$ for conducting sludge from sleeve pocket 52. The sleeve pocket is thus washed by the fuel mixture passing through intake 10, the motion of sleeve valve C assisting in pumping the fuel mixture between intake 10 and sleeve pocket 52.

It will be apparent to those skilled in the art to which my invention pertains that other changes and modifications may be made therein without departing from the spirit of my invention or from the scope of the appended claims.

What I claim as my invention is:

1. A sleeve valve engine comprising a cylinder structure provided with a piloting means, a piston, sleeve valve means, a cylinder head structure depending within the cylinder bore and spaced therefrom to provide a sleeve pocket for receiving said sleeve valve means, and pilot portion carried by said cylinder head and engaging said piloting means to locate the head in a predetermined fixed position relative to the cylinder bore, said cylinder head structure having a recessed portion bounded by said pilot portion for receiving the sleeve valve means.

2. A sleeve valve engine comprising a cylinder, a piston, sleeve valve means, and a cylinder head depending within said cylinder and constructed to provide a pilot portion engaging the cylinder bore to position the cylinder head with respect to the cylinder, the lower portion of said head spaced from said cylinder to provide a sleeve pocket for receiving the upper portion of the sleeve valve means, said cylinder and cylinder head provided with complementary beveled seat portions adapted for sealing the joint between said cylinder and cylinder head.

3. A sleeve valve engine comprising a cylinder, a piston, sleeve valve means, and a cylinder head depending within said cylinder and constructed to provide a pilot portion engaging the cylinder bore to position the cylinder head with respect to the cylinder, the lower portion of said head spaced from cylinder to provide a sleeve pocket for receiving the upper portion of the sleeve valve means, said cylinder and cylinder head provided with complementary beveled seat portions below the pilot means for sealing the joint between said cylinder and cylinder head.

4. A sleeve valve engine comprising a cylinder structure provided with a plurality of beveled seats, a piston, sleeve valve means, a cylinder head structure depending within the cylinder bore and spaced therefrom to provide a sleeve pocket for receiving said sleeve valve means, and a plurality of pilot means carried by said cylinder head and engaging said beveled seats to locate the head in a predetermined fixed position relative to the cylinder bore.

5. A sleeve valve engine comprising a cylinder structure having a cylinder bore and an enlarged concentric cylindrical bore adjacent the cylinder top, a piston, sleeve valve means, a cylinder head structure depending within the cylinder bore in spaced relation therewith to provide a sleeve pocket for receiving said sleeve valve means, said cylinder head structure provided with an undercut annular pilot portion adapted for engagement with the enlarged cylindrical bore to locate the head in a predetermined fixed position relative to the cylinder bore, said undercut pilot portion providing an annular recess adapted for receiving the upper portion of said sleeve valve means.

6. In an engine of the sleeve valve type having a cylinder structure with associated piston, and cylinder head structure, said cylinder and cylinder head structures having cooperating bevelled portions.

7. In an engine of the sleeve valve type having a cylinder structure with associated piston, and cylinder head structure, said cylinder and cylinder head structures having cooperating bevelled annular seat portions.

8. In an engine of the sleeve valve type having a cylinder structure with associated piston, and cylinder head structure, said cylinder and cylinder head structures having cooperating bevelled portions located substantially at the outer end of the cylinder structure.

9. In an engine of the sleeve valve type having a cylinder structure with associated piston, and cylinder head structure, said cylinder and cylinder head structures having cooperating bevelled portions, said bevelled portions being spaced inwardly from the outer end of the cylinder structure.

10. In an engine of the sleeve valve type having a cylinder structure with associated piston, and cylinder head structure, said cylinder and cylinder head structures having cooperating bevelled portions, said cylinder head structure having a cylindrical portion below the said bevelled portion thereof and piloting within said cylinder structure.

11. In an engine of the sleeve valve type having a cylinder structure with associated piston, and cylinder head structure, said cylinder and cylinder head structures having cooperating bevelled portions, said cylinder head structure having a cylindrical portion below the said bevelled portion thereof and piloting within said cylinder structure, said cylinder head structure having a cylindrical portion below said piloting portion and spaced within said cylinder structure.

12. A sleeve valve engine comprising a cylinder structure having an enlarged concentric cylindrical bore adjacent the outer end of the cylinder structure, a piston, sleeve valve means, a cylinder head structure depending within the cylinder bore in spaced relation therewith to receive said sleeve valve means, said cylinder head structure having an undercut portion receiving the upper end of said sleeve valve means.

13. A sleeve valve engine comprising a cylinder structure having an enlarged concentric cylindrical bore adjacent the outer end of the cylinder structure, a piston, sleeve valve means, a cylinder head structure depending within the cylinder bore in spaced relation therewith to receive said sleeve valve means, said cylinder head structure having an undercut portion receiving the upper end of said sleeve valve means, said cylinder head structure having a cylindrical portion fitting said enlarged bore of the cylinder structure.

14. A sleeve valve engine comprising a cylinder structure, a piston, sleeve valve means, a cylinder head structure having a portion thereof depending within the cylinder structure and spaced therefrom to accommodate said sleeve valve means, said cylinder head structure having an annular recess into which the upper end of the sleeve valve means projects.

15. A sleeve valve engine comprising a cylinder structure, a piston, sleeve valve means, a cylinder head structure having a portion thereof depending within the cylinder structure and spaced therefrom to accommodate said sleeve valve means, said cylinder head structure having an annular recess into which the upper end of the sleeve valve means projects, said recess having its walls spaced from the sleeve valve means.

16. A sleeve valve engine comprising a cylinder structure, a piston, sleeve valve means, a cylinder head structure having a portion thereof depending within the cylinder structure and spaced therefrom to accommodate said sleeve valve means, said cylinder head structure having an annular recess into which the upper end of the sleeve valve means projects, said cylinder structure having an enlarged bore adjacent the outer end thereof providing a pilot for the cylinder head structure.

17. A sleeve valve engine comprising a cylinder structure formed with concentric inner and outer bores separated by a land, sleeve valve means associated with said inner bore, a cylinder head structure having a depending portion associated with said outer bore and provided with an inwardly opening pocket adapted to receive the outer end of the sleeve valve means, said depending portion of the cylinder head structure associated with said outer bore being spaced from said land.

18. A sleeve valve engine comprising a cylinder structure formed with concentric inner and outer bores separated by a land, sleeve valve means associated with said inner bore, a cylinder head structure having a depending portion associated with said outer bore and provided with an inwardly opening pocket adapted to receive the outer end of the sleeve valve means, said depending portion of the cylinder head structure associated with said outer bore being seated on said land.

19. A sleeve valve engine comprising a cylinder structure formed with concentric inner and outer bores separated by a land, sleeve valve means associated with said inner bore, a cylinder head structure having a depending portion associated with said outer bore and provided with an inwardly opening pocket adapted to receive the outer end of the sleeve valve means, a sealing gasket seated on said land, said depending portion of the cylinder head structure associated with said outer bore being seated on said gasket.

20. In an engine of the sleeve valve type, a cylinder having an inner bore and an enlarged outer bore, a cylinder head structure having a portion fitted to said enlarged bore and having a second portion spaced from the inner bore, sleeve valve means intermediate the inner bore and cylinder head structure, said first portion of the cylinder head structure overlapping the sleeve valve means axially thereof.

21. A sleeve valve engine comprising a cylinder structure having an enlarged concentric cylindrical bore adjacent the outer end of the cylinder structure, a piston, sleeve valve means, a cylinder head structure depending within the cylinder bore in spaced relation therewith to receive said sleeve valve means, said cylinder head structure having an undercut portion receiving the upper end of said sleeve valve means, means conducting fuel mixture to the engine, and means establishing communication between said undercut portion of the cylinder head structure and said fuel mixture conducting means.

22. A sleeve valve engine comprising a cylinder structure, a piston, sleeve valve means, a cylinder head structure having a portion thereof depending within the cylinder structure and spaced therefrom to accommodate said sleeve valve means, said cylinder head structure having an annular recess into which the upper end of the sleeve valve means projects, means conducting fuel mixture to the engine, and means establishing communication between said annular recess and said fuel mixture.

23. A sleeve valve engine comprising a cylinder structure, a piston, sleeve valve means, a cylinder head structure having a portion thereof depending within the cylinder structure and spaced therefrom to accommodate said sleeve valve means, said cylinder head structure having a collar separate therefrom but associated therewith to form therewith an annular recess into which the upper end of the sleeve valve means projects.

24. A sleeve valve engine having a cylinder formed with an annular land providing an enlarged bore adjacent its outer end, sleeve valve means operable within said cylinder, a piston co-axial with said cylinder, a cylinder head structure having a portion depending within said cylinder and spaced therefrom above said piston to accommodate said sleeve valve means, said cylinder head structure having a pilot portion fitting said enlarged bore and seated on said land whereby to additionally align said cylinder head structure with said cylinder.

25. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, one of said structures having a deposit conducting passage, said cylinder head structure provided with a conduit intermediate the sleeve pocket and said passage.

26. In an engine of the sleeve valve type, a cylinder block structure having a cylinder contained therein, a cylinder head structure closing one end of the cylinder, sleeve valve means operably associated with the cylinder, said structures cooperating to provide a pocket for receiving the sleeve valve means, one of said structures having a deposit conducting passage, said cylinder head structure provided with a flange seated on the cylinder block structure, said flange having a conduit intermediate the sleeve pocket and said passage.

27. In a sleeve valve engine, a cylinder formed with an annular land providing an enlarged bore adjacent its outer end, sleeve valve means operable within said cylinder, a piston coaxial with said cylinder, a cylinder head structure depending within said cylinder and spaced therefrom above said cylinder to form a sleeve pocket to accommodate said sleeve valve means, said cylinder head structure having a pilot portion fitting said enlarged bore and seated on said land whereby to additionally align said cylinder head structure with said cylinder, said enlarged bore extending from said land to the upper face of said cylinder block structure.

28. In a sleeve valve engine, a cylinder formed with an annular land providing an enlarged bore adjacent its outer end, sleeve valve means operable within said cylinder, a piston coaxial with said cylinder, a cylinder head structure depending within said cylinder and spaced therefrom above said cylinder to form a sleeve pocket to accommodate said sleeve valve means, said cylinder head structure having a pilot portion fitting said enlarged bore and seated on said land whereby to additionally align said cylinder head structure with said cylinder, said enlarged bore extending from said land to the upper face of said cylinder block structure, said land terminating inwardly at said cylinder.

29. In a sleeve valve engine, a cylinder formed with an annular land providing an enlarged bore adjacent its outer end, sleeve valve means operable within said cylinder, a piston coaxial with said cylinder, a cylinder head structure depending within said cylinder and spaced therefrom above said cylinder to form a sleeve pocket to accommodate said sleeve valve means, said cylinder head structure having a pilot portion fitting said enlarged bore and seated on said land whereby to additionally align said cylinder head structure with said cylinder, said enlarged bore extending from said land to the upper face of said cylinder block structure, said land terminating inwardly at said sleeve pocket.

30. In a sleeve valve engine, a cylinder formed with an annular land providing an enlarged bore adjacent its outer end, sleeve valve means operable within said cylinder, a piston coaxial with said cylinder, a cylinder head structure depending within said cylinder and spaced therefrom above said cylinder to form a sleeve pocket to accommodate said sleeve valve means, said cylinder head structure having a pilot portion fitting said enlarged bore and seated on said land whereby to additionally align said cylinder head structure with said cylinder, said enlarged bore extending from said land to the upper face of said cylinder block structure, said land terminating inwardly at said sleeve pocket, and at one end thereof axially of said cylinder.

31. In a sleeve valve engine, a cylinder block structure formed with a cylinder, a cylinder head structure having a portion depending within said cylinder, sleeve valve means within said cylinder, said depending portion being spaced from said sleeve valve means to provide a sleeve pocket for the outer end of the sleeve valve means, said cylinder being formed with a land providing an enlarged cylinder bore extending outwardly from the land to the outer face of said cylinder block, said cylinder head structure having a pilot portion fitting said enlarged bore and seated directly on said land whereby to additionally align said cylinder head structure with said cylinder, said land terminating inwardly at said cylinder and outwardly at said enlarged bore.

32. In an engine of the sleeve valve type, a cylinder block having a cylinder formed with a single land providing a single enlarged bore opening outwardly of the cylinder block, a cylinder head structure piloted in said enlarged bore and seated on said land, said cylinder head structure providing a sleeve pocket one end of which is located substantially adjacent said land, and sleeve valve means within said cylinder projecting into said pocket.

JAMES O. FINK.